(12) United States Patent
Seregin et al.

(10) Patent No.: US 7,223,348 B1
(45) Date of Patent: May 29, 2007

(54) METHOD AND APPARATUS FOR SEPARATION OF A MIXTURE OF NON-MISCIBLE LIQUIDS

(75) Inventors: Alexander Seregin, Moscow (RU);
Victor Ermolov, Moscow (RU);
Vladimir Minaev, Moscow (RU);
Andrey Orlov, Moscow (RU)

(73) Assignee: Lisopharm AG (CH)

( * ) Notice: Subject to any disclaimer, the term of this patent is extended or adjusted under 35 U.S.C. 154(b) by 0 days.

(21) Appl. No.: 10/257,231

(22) PCT Filed: Apr. 6, 2000

(86) PCT No.: PCT/IB00/00417

§ 371 (c)(1),
(2), (4) Date: Jan. 30, 2003

(87) PCT Pub. No.: WO01/76716

PCT Pub. Date: Oct. 18, 2001

(51) Int. Cl.
*B01D 17/028* (2006.01)

(52) U.S. Cl. .................. 210/802; 210/521; 210/532.1; 210/540

(58) Field of Classification Search ................ 210/513, 210/521, 522, 532.1, 538, 540; 166/267
See application file for complete search history.

(56) References Cited

U.S. PATENT DOCUMENTS

| | | | | | |
|---|---|---|---|---|---|
| 2,284,737 | A | * | 6/1942 | Hirshstein | 210/539 |
| 2,688,368 | A | * | 9/1954 | Rodgers et al. | 166/267 |
| 2,751,998 | A | * | 6/1956 | Glasgow | 95/24 |
| 2,868,384 | A | * | 1/1959 | Puddington | 210/521 |
| 2,998,096 | A | * | 8/1961 | Snipes | 96/161 |
| 3,705,626 | A | * | 12/1972 | Glenn et al. | 166/267 |
| 3,849,311 | A | * | 11/1974 | Jakubek | 210/188 |

(Continued)

FOREIGN PATENT DOCUMENTS

| DE | 205 074 B | 12/1983 |
|---|---|---|
| DE | 44 37 837 A | 4/1996 |

OTHER PUBLICATIONS

Derwent Publications Ltd., London, GB; AN 1994-331273, XP002156309 & SU 1 819 653 A ((TART) Tartat Oil Instit), Jun. 7, 1993 abstract.

*Primary Examiner*—Robert James Popovics

(57) ABSTRACT

The present invention provides a new and improved method and apparatus for separating a disperse mixture of two non-miscible liquids to increase the separation extent within less time required as per usual. The proposed method includes the steps of providing a tank having an elongated horizontal extension terminated by two end faces (4, 5), creating within said tank an interface (13) between a first layer formed by a volume of one of said two liquids and a second layer formed by a volume of the other of said two liquids with, and supplying said disperse mixture into the tank from one of said end faces (4) thereof directly into said interface (13).

Figure 1:
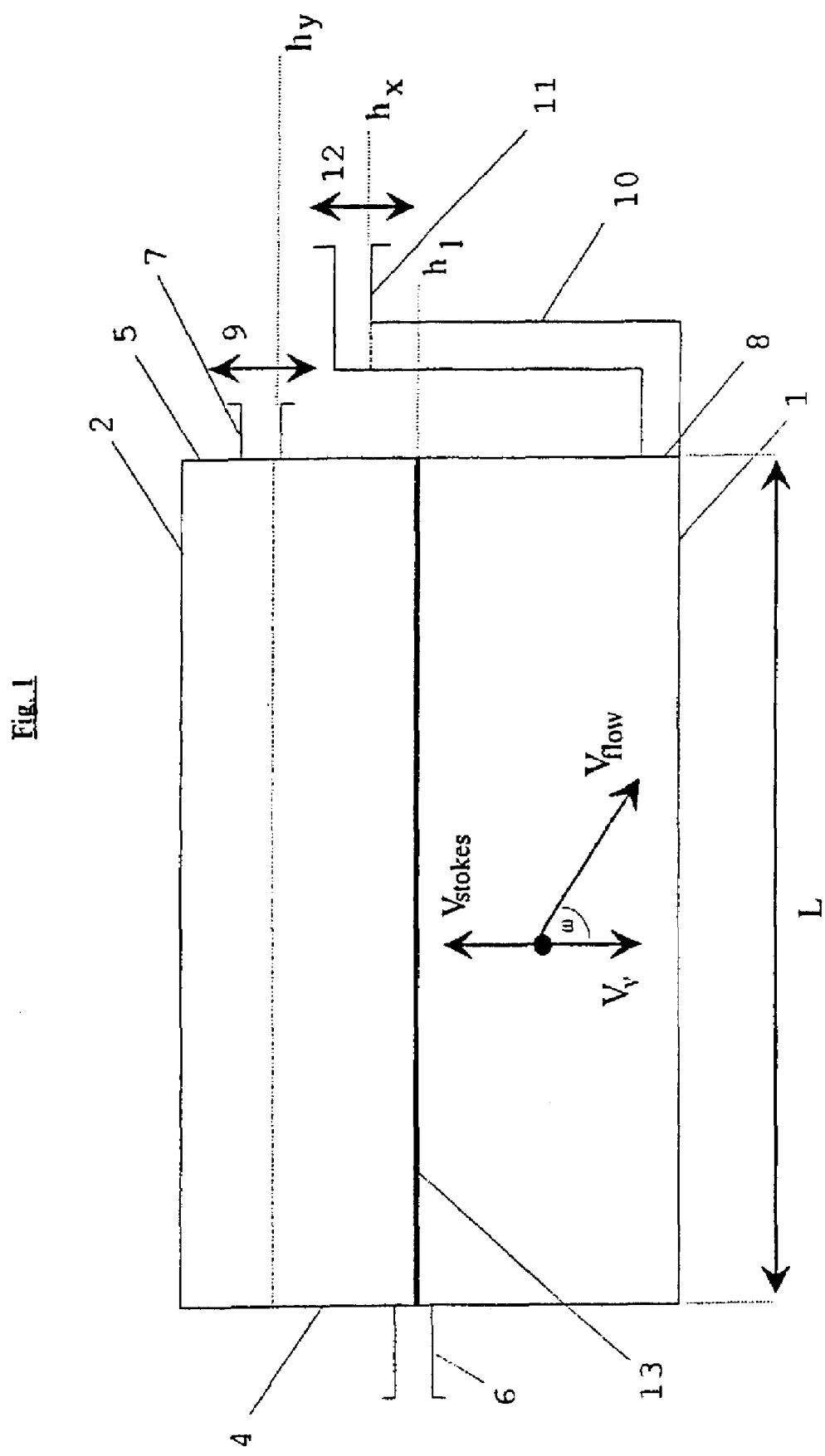

The inventive apparatus comprises a tank having an inlet opening (6) mounted at an end wall (4) at the beginning of the said elongated horizontal path for supplying the said mixture to be separated, two outlet openings (7, 8) mounted at the end of the said elongated horizontal for separately draining the separated liquids, whereby an outlet opening (8) is located below the inlet opening and is connected to a vertical channel (10) furnished with a sink (11) which is located at least on the level of the inlet opening (6).

5 Claims, 3 Drawing Sheets

U.S. PATENT DOCUMENTS

| | | | | |
|---|---|---|---|---|
| 3,914,175 A | * | 10/1975 | Kunz et al. | 210/802 |
| 3,933,654 A | * | 1/1976 | Middelbeek | 210/521 |
| 4,042,512 A | * | 8/1977 | McCarthy et al. | 210/519 |
| 4,064,054 A | * | 12/1977 | Anderson et al. | 210/536 |
| 4,115,279 A | * | 9/1978 | Toft | 210/521 |
| 4,123,365 A | * | 10/1978 | Middelbeek | 210/521 |
| 4,132,652 A | * | 1/1979 | Anderson et al. | 210/536 |
| 4,149,973 A | * | 4/1979 | Harris | 210/305 |
| 4,233,154 A | * | 11/1980 | Presley | 210/800 |
| 4,385,986 A | * | 5/1983 | Jaisinghani et al. | 210/123 |
| 4,435,196 A | * | 3/1984 | Pielkenrood | 96/184 |
| 4,722,800 A | * | 2/1988 | Aymong | 210/802 |
| 5,076,937 A | * | 12/1991 | Montgomery | 210/705 |
| 5,114,578 A | * | 5/1992 | Sundstrom | 210/256 |
| 5,149,344 A | * | 9/1992 | Macy | 96/159 |
| 5,266,191 A | * | 11/1993 | Greene et al. | 210/195.1 |
| 5,679,265 A | * | 10/1997 | Van Schie | 210/776 |
| 5,705,055 A | * | 1/1998 | Holloway et al. | 210/115 |
| 5,857,522 A | * | 1/1999 | Bradfield et al. | 166/267 |
| 5,900,137 A | * | 5/1999 | Homan | 210/85 |
| 5,900,154 A | * | 5/1999 | Henriksen | 210/703 |
| 5,928,519 A | * | 7/1999 | Homan | 210/741 |
| 5,928,524 A | * | 7/1999 | Casola | 210/802 |
| 6,056,128 A | * | 5/2000 | Glasgow | 210/521 |
| 6,110,383 A | * | 8/2000 | Coombs et al. | 210/732 |
| 6,207,061 B1 | * | 3/2001 | Pedersen et al. | 210/708 |
| 6,350,374 B1 | * | 2/2002 | Stever et al. | 210/170 |
| 6,537,458 B1 | * | 3/2003 | Polderman | 210/801 |
| 6,773,605 B2 | * | 8/2004 | Nyborg et al. | 210/741 |
| 6,824,696 B1 | * | 11/2004 | Tolmie et al. | 210/801 |
| 6,827,865 B1 | * | 12/2004 | Fenwick | 210/802 |
| 7,011,743 B2 | * | 3/2006 | Use et al. | 210/131 |
| 2003/0116500 A1 | * | 6/2003 | Hoffmann | 210/521 |
| 2005/0023228 A1 | * | 2/2005 | Fenwick | 210/802 |
| 2005/0218070 A1 | * | 10/2005 | Seregin et al. | 210/521 |
| 2005/0230296 A1 | * | 10/2005 | Edmondson | 210/187 |
| 2006/0006125 A1 | * | 1/2006 | Tolmie et al. | 210/801 |

* cited by examiner

METHOD AND APPARATUS FOR SEPARATION OF A MIXTURE OF NON-MISCIBLE LIQUIDS

The invention relates to a method and an apparatus for separating a disperse mixture of non-miscible liquids, especially to a method and an apparatus for separating a disperse mixture of two non-miscible liquids and in particular of petroleum or gasoline or Diesel fuel and water.

For separating a disperse mixture of non-miscible liquids, for example of water and petroleum, usually separators are used. Such separators may consist of a tank or container to which the mixture to be separated is periodically or continuously supplied. Typically, partitions are mounted within the separators to create liquid flows for separating solid impurities, for instance sand and chips. The settling and separating of the liquids occurs by means of gravity, thereby forming water and petroleum layers from which liquid is drained by means of outlet branch pipes.

However, water and petroleum mixtures usually consist of water drops dispersed in petroleum or of petroleum drops dispersed in water, i.e. elements of direct and reverse emulsions which are of a high stability. The sizes of the emulsion drops may vary in a wide range, from several micrometers to several millimeters. Consequently, a complete separation of a disperse mixture by gravity requires a substantial amount of time.

Document GB 2.089.670 discloses a method for separating an emulsion of water and petroleum. According to this method, an upper petroleum layer and a lower water layer is created inside a separator. The disperse mixture to be separated is supplied in vertical direction directly into the top petroleum layer. As the water-petroleum mixture passes through the trapping petroleum layer a substantial amount of petroleum from the mixture is kept in the petroleum layer. The mixture passed through the petroleum layer is subsequently fed into the low water layer. The separator further comprises sections furnished with traps to capture petroleum from the mixture. After the separation of the mixture, petroleum and water are drained from the upper petroleum layer and from the low layer, respectively.

However, microscopic studies have shown that passing the mixture through a petroleum layer results in decreasing of the amount of large petroleum drops in purified water whereby, unfortunately, at the same time the amount of fine petroleum drops in water increases. Thus the separation is not satisfactory from an environmental point of view.

An object of the present invention is to provide a new and improved way of separating a disperse mixture of two non-miscible liquids, that increases the separation extent within less time required as per usual and results in a reduction of the overall dimensions of a separator as well as the material consumption.

The object is achieved by a method and an apparatus incorporating the features of claim 1 and 6, respectively.

For separating a disperse mixture of two non-miscible liquids in accordance with the present invention it is proposed to create, within a tank having an elongated horizontal inner extension, an interface between a first layer formed by a volume of one of said two liquids and a second layer formed by a volume of the other of said two liquids and to feed the disperse mixture to be separated directly into this interface.

Since in the interface region the distances are short between each liquid layer and the emulsion drops of the liquid dispersed in the respective other liquid, the required time for a desired moving of the drops solely by means of gravity is substantially decreased. Furthermore, the forces occurring at such interfaces resulting in surface tension and an electric double layer enable to decrease a stability of emulsion, to swallow up emulsion drops and to favor the transfer of the dispersed liquid drops into the respective liquid layer.

To perform the inventive method an inventive apparatus comprising a tank which has an inlet opening at the beginning of the said elongated horizontal extension path for supplying a flow of the said mixture to be separated and at the end of that path two outlet openings adapted for separately draining liquid of the first layer at a level below said interface and liquid of the second layer at a level above said interface, whereby the outlet opening for draining liquid of the first layer is connected to a vertical channel furnished with a sink which is located at least on the level of the inlet opening.

With such a construction it is guaranteed that the mixture to be separated has to pass the entire elongated extension path before liquid is drained by the outlet openings. Since the lower outlet opening is connected to a sink which is located at least on the level of the inlet opening, the level of the interface can be adjusted to be always equal or at least near the level of the inlet opening. Consequently, the flow of mixture to be separated can be supplied into the interface in substantial in horizontal direction so that the path of the flow of mixture along the interface can advantageously be extended. Moreover, the inventive apparatus purposely is capable of an efficient purification for example of petroleum from water dispersed within the petroleum and/or of water from petroleum dispersed within the water.

For ensuring that a maximal amount of the flow of mixture is guided into the interface, the inlet opening is formed as a horizontal slot.

For ensuring a flow of the mixture to be separated in vertical and horizontal direction as well as for prolonging the time of contacting the interface, a guiding means is fixed within the tank that extends, in particular in vertical direction and/or is tilted relative to the horizontal plane with clearances to guide the flow as desired along the extended path. By increasing the holding time of the mixture inside the tank and in the interface, the overall dimensions of a separating apparatus and the material consumption are further essentially reduced.

Advantageously, the apparatus comprises means for adjusting the draining levels to easily optimise the volumes and/or heights of the liquid layers and the level of the interface.

To provide a supplementary interface for increasing the separation of the mixture, said tank is provided with lyophilic and/or lyophobic covered means.

Purposely, the bottom of the tank includes a hollow or a collector to collect solid particles or impurities contained in the mixture.

Figure 2:
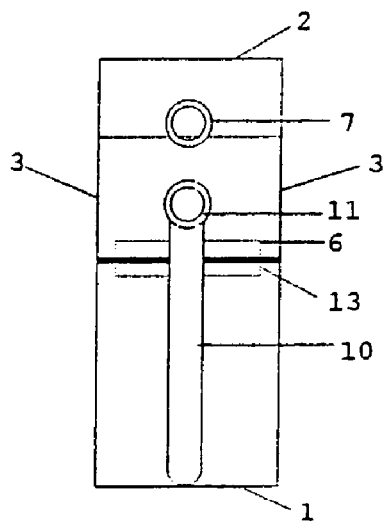
Figure 3:
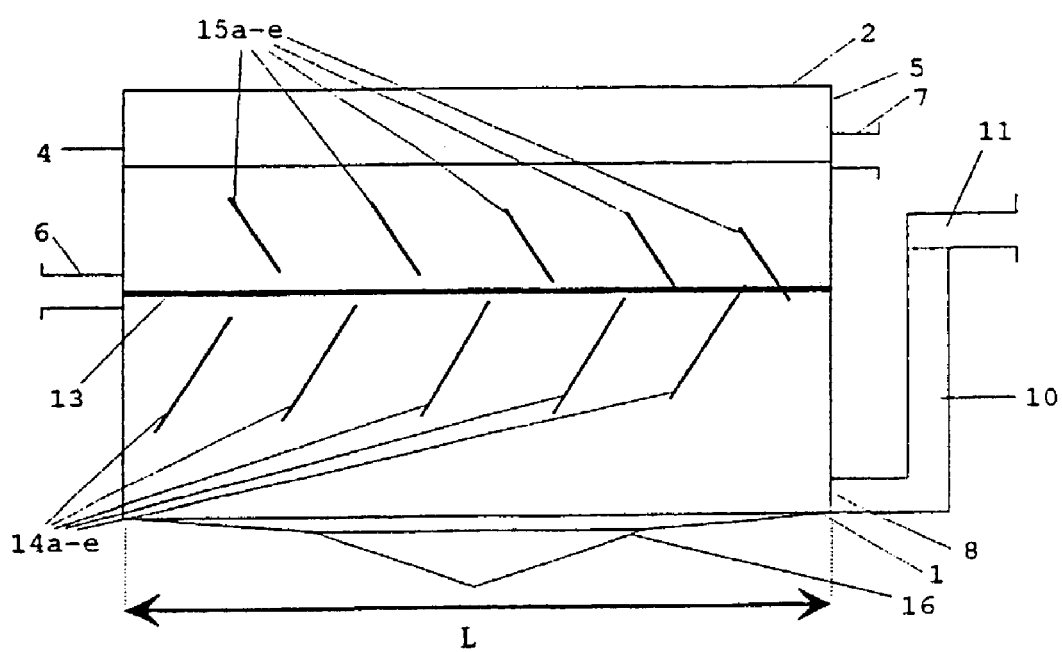
Figure 4:
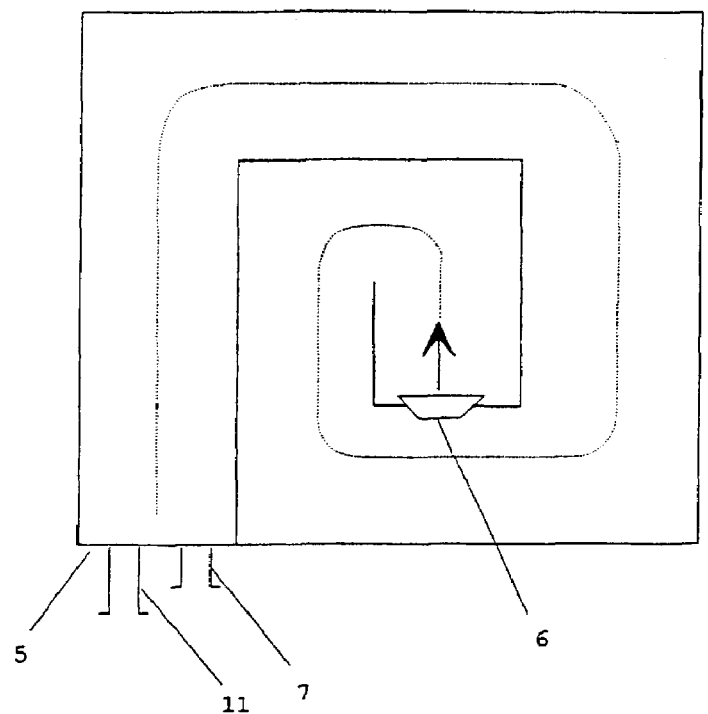
Figure 5:
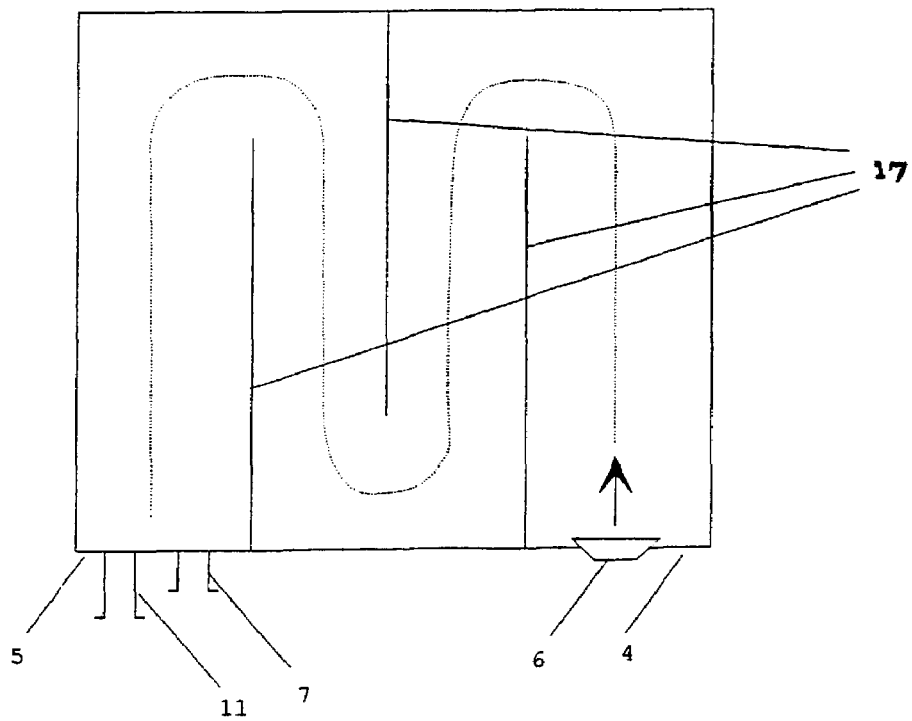

The invention is described in more detail in view of preferred embodiments and in connection with the appended drawings of in which FIG. 1 schematically shows a longitudinal section of a first embodiment according to the invention, FIG. 2 schematically shows a front view of the embodiment of FIG. 1, FIG. 3 schematically shows a longitudinal section of a second embodiment according to the invention, FIG. 4 schematically shows a top view of a third embodiment according to the invention, FIG. 5 schematically shows a top view of a fourth embodiment according to the invention.

In the following the invention firstly is described by an apparatus for separating a disperse mixture of two non-miscible liquids according to FIG. 1 and FIG. 2 showing a longitudinal section of a first embodiment and a front view of that embodiment, respectively, according to the invention.

However, it has to be noted that the disperse mixture to be separated can be of any kind of two non-miscible liquids. For the reason of clarity, however, the description is given on the exemplary mixture of petroleum and water. Thus the emulsion comprises water drops dispersed in petroleum and/or petroleum drops dispersed in water.

The apparatus of FIG. 1 and FIG. 2 comprises a container or a tank having a bottom 1, a cover 2 and side walls 3 providing an elongated horizontal extension "L" terminated by two end walls 4 and 5. An inlet opening 6 is located at the end wall 4 at the beginning of the elongated tank extension for feeding the disperse mixture of two non-miscible liquids to be separated. Two outlet openings 7 and 8 are mounted at maximal distance from the inlet opening, according to the embodiment of FIG. 1 at the other end wall 5 for separately draining these two liquids subsequent to separation. Thus, an elongated path for a flow of mixture to be separated within the tank is ensured, that is equal to the entire elongated horizontal extension "L" between the end walls 4 and 5.

The outlet opening 7 is provided with a non-shown level adjustment device to adjust, as indicated by arrow 9, the level $h_y$ approximately from the level of the inlet opening 6 to the level of the cover 2.

The outlet opening 8 is linked to a vertical channel 10 which is furnished with a sink 11. The sink 11 in turn has a non-shown level adjustment device designed to adjust, as indicated by arrow 12, the level $h_x$, approximately from the level of the inlet opening 6 to the level of the cover 2.

At a level $h_I$ an interface 13 is created between two liquid layers. Each of the liquid layers is formed by a volume of respective one of the two non-miscible liquids constituting the disperse mixture. Thus, having a mixture comprising petroleum and water, as noted above, whereby petroleum has a density less than water, the layer of liquid below the interface is formed by a volume of water and the upper liquid layer consists of petroleum.

As a consequence, outlet opening 7 is located above the interface 13 for draining liquid from the petroleum layer and the lower outlet opening 8 is located below the interface 13, purposefully near the bottom 1, for draining liquid from the water layer. Moreover, the level $h_y$ at which the outlet opening 7 is located determines a column height of the lighter liquid, and the level $h_x$ at which the sink 11 linked via channel 10 to the outlet opening 8 is located determines the drain level of the heavier liquid. Accordingly, this arrangement permits the use of the inventive apparatus both for purification of water from petroleum admixture and for purification of petroleum from water admixture.

The vertical channel 10 which is connected to the outlet opening 8 for heavy liquid may be designed and made for example as bellows. This enables easy adjustment of the discharge level of the heavy liquid from the tank and by this way to keep the level $h_I$ of the interface 13 at a desired level. The level of outlet from the vertical channel 10 may be regulated by any known method, for example by means of a vertically adjustable partition like a weir mounted at the wall 5 having the outlet opening 8.

Even for adjusting a level at which the outlet opening 7 is located to drain the lighter liquid from the tank in substantial any measure for regulation as known by a person skilled in the art may be provided, for example the upper part of end wall 5 may be made vertically movable or a vertically adjustable partition like a weir through which the lighter liquid is drained from the tank could be mounted on the top of the end wall 5.

It should be remarked that the term "level" throughout the description and the claims is denoting a distance or a height from the tank bottom.

The principle of using the apparatus of FIG. 1 for separating a disperse mixture of two non-miscible liquids into the components in accordance with the present invention is as follows.

Primarily the interface 13 between the two non-miscible liquids has to be created within the tank. Therefore the tank could be filled substantially with pure water to the level $h_I$ forming the layer below the interface 13 and subsequently with pure petroleum forming an upper liquid layer. Alternatively, without deteriorating the separation, the tank may be filled only partially with water and petroleum with subsequent filling by the mixture to be separated. Furthermore, it may be also admitted that the initial mixture is supplied to the tank at the very beginning.

However, the feeding of mixture to be separated into the tank before the interface 13 is completed, results in a waiting time until a sufficient amount of water drops dispersed in petroleum is sedimented and/or a sufficient amount of petroleum drops dispersed in water is upwardly moved such that an interface 13 is created.

The regulation of the height of the interface 13 at a desired level $h_I$ can be achieved by using the level adjustment device furnished at the sink 11. As stated above, since the adjusting of the drain level $h_x$ resulting in a desired level $h_I$ of the liquid below the interface, i.e. of the water having the higher density, the level adjustment device of sink 11 is capable to ensure a location of the interface between the heavy and light liquids around the level of the inlet opening during operation of the installation.

For ensuring that the flow of mixture is in substantial along a horizontal plane in order to increase the time of the flow of the mixture around the interface, the level $h_I$ of the interface 13 should be substantially at the level of the inlet opening 6.

Then the emulsion to be separated is periodically or continuously fed through the inlet opening 6 directly into the interface 13. During the operation of the apparatus for separating the mixture into its two liquid components the level $h_I$ of the interface 13, i.e. the volume of water is kept constant.

The separated liquids are separately drained from the apparatus through the outlets 7 and 8, respectively.

The inlet opening 6 in principle may be made in any specific shape, for example in a ring-like or an oval-like shape. However, for guiding a maximal flow of the disperse mixture into the interface such, that the holding time of the flow of mixture around the interface is prolonged, the inlet opening 6 is purposefully designed as a horizontal slot, as indicated by the dotted line in FIG. 2.

By prolonging the holding time of the mixture in or at least around the interface the extent of separation is favored due to the following reasons:

The separation of an emulsion by gravity, i.e. dispersed drops having a density less than the respective dispersion medium are moving up and/or dispersed drops having a density greater than the respective dispersion medium are moving down, requires substantial time. However, in the interface region the distances between the interface 13 and both any petroleum drops dispersed in water and any water drops dispersed in petroleum are very small. Consequently, the separating movement of the drops to the interface by means of the gravity forces requires less time. Thus, during a prolonged holding time of the mixture in the interface the major part of the drops are swallowed up.

Moreover, at the interface region the emulsion drops are exposed to forces caused by the surface tension and electric double layer occurring in any interfaces. The effects of these forces favor a decreasing of the emulsion stability, a rupture of the emulsion drops, particularly by coalescence, and in turn the transfer of petroleum contained in petroleum drops dispersed in water into the petroleum layer and water contained in water drops dispersed in petroleum into the water layer, respectively The parameters describing the flow of the mixture relate to each other by the following functional relations (FIG. 1). A particle of the lighter liquid, i.e. petroleum, with a mean radius "R" of the drops being spread in the heavier liquid, i.e. water, moves upward with the Stokes velocity $$V_{Stokes} = k*R^{2}*(\Delta\rho/\Delta\eta)$$

whereby $\Delta\rho$ is representing the difference of the densities of the two non-miscible liquids, $\Delta\eta$ is representing the difference of the viscosities of the two non-miscible liquids and k is a coefficient.

Simultaneously a particle is carried downward by the liquid flow with a velocity of the flow $V_{flow}$. For the critical condition equality of the Stokes velocity $V_{Stokes}$ is necessary and a vertical component $(V_V)$ of the velocity of the flow.

The vertical component of the flow velocity is related to the dimensions of an apparatus by the functional relationship:

$$V_V = V_{flow}*\cos\omega.$$

Providing that the elongated extension "L" is much greater than the entire liquid height $h_y$:

$$\cos\omega \approx h_y/L$$

and $$V_V \approx V_{flow}*h_y/L$$

Thus, for the critical condition of dynamic equilibrium, i.e. $V_V = V_{Stokes}$, the functional relationship is:

$$V_{flow}*h_y/L = k*R^{2}*(\Delta\rho/\Delta\eta)$$

and hence $V_{flow} = k*R^{2}*(\Delta\rho/\Delta\eta)*(L/h_y)$

As already mentioned, outlet opening 8 to drain the heavier liquid is connected to the vertical channel 10, serving for overflow of water into an exit, and thus the level $h_x$ of the overflow determines, as a person skilled in that art knows, the interface level $h_I$ inside the tank. The height, in turn, at which the outlet opening 7 is located to drain the lighter liquid determines the column height of petroleum $(h_y - h_I)$ in the tank, whereby it is proposed to locate the outlet opening 7 with the petroleum height in substantial being equal 0.01 to 0.9 of the total height of the column of liquid, i.e. $(h_y - h_I) \approx 0.01$ to $0.9*h_y$.

In the praxis a level $h_I$ of the interface 13, a column height $(h_y - h_I)$ of the lighter liquid and a linear velocity $V_{flow}$ of the flow of mixture have been proved as being capable for ensuring a very high effectiveness if they fulfil the following functional ratios with regard to the elongated path extension "L".

| $h_1/L$ | $(h_y - h_1)/L$ | $V_{flow}/L$ |
|---------|-----------------|--------------|
| 0.01 to 0.1 | 0.0005 to 0.01 | 1 to 100 s$^{-1}$ |
| 0.1 to 1.0 | 0.001 to 0.1 | 10 to 1000 s$^{-1}$ |
| 0.1 to 1.0 | 0.01 to 0.1 | 50 to 5000 s$^{-1}$ |

FIGS. 3, 4 and 5 schematically show further embodiments of the invention incorporating several purposeful measures for ensuring a horizontal and/or vertical path of motion with regard to the liquid flow inside the separator and, consequently for increasing the action time of the gravity forces and prolonging the holding time of the liquid mixture in the interface 13. However, prolonging of the holding time of the flow of mixture in or at least around the interface results in an increased efficiency and/or extent of separation of the emulsion into its components.

According to FIG. 3, the inventive apparatus for separating an emulsion additionally includes guiding plates 14a–e, 15a–e as a means for guiding the flow of mixture of the two non-miscible liquids into the interface 13 located between the two layers each formed by one of the respective liquids and accordingly for increasing the holding time of the mixture in the interface.

Several guiding plates are fixed on at least one of the side walls of the tank and situated along the horizontally extended path of the liquid mixture flow. The guiding plates may be located above (15a–e) the interface and/or below (14a–e) this interface. The plates 15a–e mounted above the interface are spaced apart from the cover 2 for a flow of the separated lighter liquid, i.e. petroleum. The plates 14a–e mounted below the interface are spaced apart from the tank bottom 1 for a flow of the liquid having the greater density, i.e. water. If the plates are located both above the interface and below the interface the upper plates may be strictly arranged above the low plates or may be shifted relative to the low plates (FIG. 3).

It should be noted, that the guiding plates may be of similar or different shapes and/or areas. Furthermore, the number of guiding plates located in the tank may be different. Purposely, the plates are fixed along the flow path of the liquid mixture from the end wall 4 with the inlet opening 6 to the end wall 5 with outlet openings 7 and 8, whereby the distances between the plates may be equal or different.

The plates are tilted at an angle of 0° to 90° relative to the horizontal plane, whereby an angle between 10 and 70° has been proved to be very suitable.

According to FIG. 3, the guiding plates 15a–e and 14a–e are alternately mounted above or below the level of the inlet opening 6 along the elongated horizontal path.

Respectively two adjacent guiding plates 14a–e and 15a–e, regarding the horizontal direction, are spaced apart from each other defining a vertical distance, whereby a distance near the inlet opening 6 substantially being equal to the vertical extent of the inlet opening 6, and the subsequent distances along the path being substantially decreased. Near the outlet openings 7 and 8, however, at least a low edge of a guiding plate 15e of the upper row is located below a top edge of a guiding plate 14e of the lower row.

The inventive apparatus further comprises embodiments having vertical partitions mounted inside the tank between the inlet 6 at the beginning of the flow path and the outlets 7 and 8 at the end of the path of flow. The partitions may be fixed on the side walls and/or for example on the tank bottom. The vertical partitions may be of arbitrary shape and, generally, made as plates fixed perpendicular to the direction of the liquid flow from the inlet opening 6 to the outlet openings 7 and 8. Thus, the tank is divided by the vertical partitions into sections with openings made in the partitions for guiding the mixture to be separated from one section to an other section. For ensuring that the mixture to be separated is guided both in vertical and horizontal directions the openings, for instance are alternately located at the side walls near the bottom and near the cover of the tank at maximal distances from each other, purposely providing a clearance to the opposite walls to form a horizontal path for flow of the mixture to be separated.

Using vertical partitions additional guiding plates fixed along the interface at an angle of 0° to 90° to the interface may be mounted at the side walls of the tank or/and on the vertical partitions for guiding the liquid flow into the interface.

Thus, by using a preferred embodiment of the inventive apparatus a substantial part of petroleum after staying in the interface area is captured by the petroleum layer. When the mixture depleted of petroleum enters into the water layer, separation of the liquids is still proceeding. The flow of liquids encounters a guiding means whose particular shape mentioned above forces the mixture flow to move in both vertical and horizontal planes. Based thereon, the flow of liquid will repeatedly enter the interface region several times. Thereby a contacting of substantially all elements of the volume of the mixture to be separated is ensured with the interface. An increased amount and/or time of contacts of the mixture to be separated with the interface is reached in particular by means of the guiding plates 14*a–e* and 15*a–e* mounted within the separator in the interface region (FIG. 3). The presence of the aforementioned vertical partitions in the separator tank increases the holding time of the mixture in both the separator and in the interface region.

Furthermore, bottom 1 optionally may include a container or hollow 16 for collecting solid particles or mechanical impurities, for example sand contained in the mixture of the non-miscible liquids to be separated. The hollow 16 according to the embodiment of FIG. 3 is designed as a kind of an inverted pyramid or cone with side faces tilted at an angle of about 45° to the horizontal plane. The bottom 1 in turn is tilted at an angle of about 10° in direction to the hollow 16.

The tank of the apparatus for separating the disperse mixture has a elongated horizontally extended path for guiding the flow of mixture there through. The tank or container may be designed and formed in any shape, particularly as horizontally elongated parallelepiped or pipe which may be rolled up in different shape, even into spiral (FIG. 4) or snake to make the apparatus more compact. However, even several tanks may be linked together by appropriate connection devices and/or pipes to ensure an extended path for the flow of mixture or a single tank is divided, for example according to FIG. 5 by vertical partitions 17 into several sections to provide a snake-like shape extending the path of flow.

All of the aforementioned units, elements and components of the apparatus are made substantially of any material, particularly of steel, concrete, light alloys, plastics.

Furthermore, in substantial all of the aforementioned components may covered with a lyophilic and/or lyophobic (and/or a hydrophobic and a hydrophilic) layer to provide a supplementary interface. Therefore parts of a means located above the interface purposefully being covered with a lyophobic layer, and parts of a means mounted below the interface purposefully being covered with a lyophilic layer.

Thus, the invention provides an apparatus capable of separating a disperse mixture, whereby all of the aforementioned components located within the tank ensuring the elongated extension for the flow of mixture are fixed at there desired location during the operation of separation and an additional energy supply or feeding is not required.

The invention, however, in particular relates to separation of petroleum or oil containing water mixture into petroleum or oil and water and/or to the separation of water containing petroleum or oil mixture into petroleum or oil and water. Consequently, the invention may in particular be used for oil rigs, i.e. for purification of water in petroleum production and petroleum refining, since normally the pipes extracting the oil are not completely watertight at the connections between components in particular due to a necessary movability. Furthermore, the invention can be used for liquidation of petroleum overflow during accidents in petroleum pipelines, for use in a factories which are dependent on pure oil mixture without any water particles or vice versa.

The invention claimed is:

1. Method for separating a disperse mixture of two non-miscible liquids, comprising the steps of:
    a) providing a tank having an elongated horizontal extension terminated by two end faces,
    b) creating within said tank a first layer formed by a volume of one of said two liquids and a second layer formed by a volume of the other said two liquids with an interface between the first and the second layers,
    c) supplying a flow of said disperse mixture into the tank through an inlet opening from one of said end faces thereof directly into said interface and separately draining liquid of the first layer at a level below said interface and liquid of the of second layer at a level above said interface; and
    d) keeping the disperse mixture around the level of said interface between the first and the second layers by providing a plurality of upper and lower guiding plates alternately mounted above and below the level of the inlet opening along the elongated horizontal extension of the tank,
    wherein the uppermost edge of each respective upper guiding plate is closer to said end face having said inlet opening than the corresponding lowermost edge of that plate, and the lowermost edge of each respective lower guiding plate is closer to said end face having said inlet opening than the corresponding uppermost edge of the plate.

2. The method of claim 1, whereby the level of said interface between the first and the second layers is substantially kept at a constant highness during step d.

3. The method of claim 1, whereby at least one supplementary interface is created by providing said tank with lyophilic and/or lyophobic covered means.

4. The method of claim 1, whereby the step of supplying the flow of mixture is continuously or periodically performed.

5. The method of claim 1, whereby a disperse mixture of water and petroleum or of water and gasoline or of water and diesel fuel or of water and a mixture of petroleum, gasoline, and/or diesel fuel is used.

\* \* \* \* \*